United States Patent
Woodbridge et al.

(10) Patent No.: US 11,241,860 B2
(45) Date of Patent: *Feb. 8, 2022

(54) RELATING TO INSULATION

(71) Applicant: Hunt Technologies Limited, Rickmansworth (GB)

(72) Inventors: Timothy John Woodbridge, London (GB); Leslie James Squires, Blairgowrie (GB); James Smith, Warrington (GB)

(73) Assignee: Hunt Technology Limited, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/494,043

(22) PCT Filed: Mar. 13, 2018

(86) PCT No.: PCT/GB2018/050638
§ 371 (c)(1),
(2) Date: Sep. 13, 2019

(87) PCT Pub. No.: WO2018/167478
PCT Pub. Date: Sep. 20, 2018

(65) Prior Publication Data
US 2021/0114330 A1    Apr. 22, 2021

(30) Foreign Application Priority Data

Mar. 13, 2017 (GB) .................................. 1703989
Aug. 30, 2017 (GB) .................................. 1713917
Nov. 3, 2017 (GB) .................................. 1718276

(51) Int. Cl.
*B32B 3/04*    (2006.01)
*B32B 7/05*    (2019.01)
(Continued)

(52) U.S. Cl.
CPC ............... *B32B 3/04* (2013.01); *B32B 5/022* (2013.01); *B32B 7/05* (2019.01); *B32B 7/14* (2013.01);
(Continued)

(58) Field of Classification Search
CPC .. B32B 3/04; B32B 7/05; B32B 5/022; B32B 7/14; B32B 23/08; B32B 23/10;
(Continued)

(56) References Cited

U.S. PATENT DOCUMENTS 4,436,809 A    3/1984    Akao et al.
4,442,162 A    4/1984    Kuester
(Continued)

FOREIGN PATENT DOCUMENTS

AU    705627 B2    6/1997
EP    1 819 509 B1    5/2011
(Continued)

OTHER PUBLICATIONS

The Intellectual Property Office of the United Kingdom—Combined Search and Examination Report under Sections 17 and 18(3), pertaining to GB Application No. 1718276.7, dated Jun. 4, 2018, 9 pages.
(Continued)

*Primary Examiner* — James C Yager
(74) *Attorney, Agent, or Firm* — Sunstein LLP

(57) ABSTRACT

A flexible insulation material comprising a flexible porous medium defining a pore volume, and a phase change material (PCM) within the pore volume.

21 Claims, 2 Drawing Sheets

(51) Int. Cl.
    *B32B 5/02*      (2006.01)
    *B32B 7/14*      (2006.01)
    *B32B 23/08*     (2006.01)
    *B32B 23/10*     (2006.01)
    *B32B 27/12*     (2006.01)
    *B32B 27/30*     (2006.01)
    *B32B 27/32*     (2006.01)

(52) U.S. Cl.
    CPC .............. *B32B 23/08* (2013.01); *B32B 23/10* (2013.01); *B32B 27/12* (2013.01); *B32B 27/306* (2013.01); *B32B 27/32* (2013.01); *B32B 2250/03* (2013.01); *B32B 2250/40* (2013.01); *B32B 2260/021* (2013.01); *B32B 2262/0253* (2013.01); *B32B 2307/304* (2013.01); *B32B 2323/10* (2013.01); *B32B 2439/00* (2013.01); *Y10T 428/1341* (2015.01); *Y10T 428/1366* (2015.01); *Y10T 428/1379* (2015.01)

(58) Field of Classification Search
    CPC ....... B32B 27/12; B32B 27/306; B32B 27/32; B32B 2439/00; B32B 2323/10; B32B 2250/03; B32B 2250/40; B32B 2260/021; B32B 2262/0253; B32B 2307/304; B32B 2250/04; B32B 2250/05; B32B 2250/24; B32B 2250/44; B32B 2255/02; B32B 2255/10; B32B 2255/20; B32B 2255/24; B32B 2255/26; B32B 2307/31; B32B 2307/416; B32B 2307/546; B32B 2307/724; B32B 2307/7265; B32B 5/02; B32B 7/12; B32B 27/08; B32B 27/34; B32B 2439/62; B32B 2439/80; B32B 2439/70; B32B 2305/026; B32B 2264/105; B32B 2307/702; B32B 2307/704; B32B 2307/728; B32B 2311/24; B32B 2262/0284; B32B 2255/205; Y10T 428/1379; Y10T 428/1341; Y10T 428/1366
    See application file for complete search history.

(56) References Cited

U.S. PATENT DOCUMENTS

| | | | |
|---|---|---|---|
| 4,687,692 | A | 8/1987 | Akao et al. |
| 5,637,389 | A | 6/1997 | Colvin et al. |
| 6,482,332 | B1 | 11/2002 | Malach |
| 7,328,583 | B2 | 2/2008 | Hillman et al. |
| 8,449,947 | B2 | 5/2013 | Grynaeus et al. |
| 2003/0124278 | A1 | 7/2003 | Clark et al. |
| 2003/0124318 | A1 | 7/2003 | Magill et al. |
| 2005/0224501 | A1 | 10/2005 | Folkert et al. |
| 2009/0230138 | A1 | 9/2009 | Williams et al. |
| 2011/0130062 | A1 | 6/2011 | Squires |
| 2011/0258972 | A1 | 10/2011 | Kenneally |
| 2015/0053086 | A1 | 2/2015 | Rebouillat et al. |
| 2015/0239639 | A1 | 8/2015 | Wenner et al. |
| 2015/0367604 | A1 | 12/2015 | Anderson et al. |
| 2016/0257479 | A1 | 9/2016 | Seiders et al. |

FOREIGN PATENT DOCUMENTS

| | | | |
|---|---|---|---|
| GB | 2117536 | A | 10/1983 |
| GB | 2119707 | A | 11/1983 |
| GB | 2163724 | A | 3/1986 |
| GB | 2448469 | A | 10/2008 |
| GB | 2452059 | A | 2/2009 |
| JP | S5742919 | A | 10/1982 |
| JP | H2232291 | | 9/1990 |
| JP | H0768141 | A | 3/1995 |
| WO | WO 96/39295 | A1 | 12/1996 |
| WO | WO 03/059614 | A1 | 7/2003 |
| WO | WO 2009/024804 | A1 | 2/2009 |
| WO | 2013025827 | A1 | 2/2013 |
| WO | WO 2014/070167 | A1 | 5/2014 |
| WO | WO 2014/185925 | A1 | 11/2014 |
| WO | 2016171539 | A1 | 10/2016 |
| WO | WO 2018/213348 | A2 | 11/2018 |

OTHER PUBLICATIONS

The Intellectual Property Office of the United Kingdom—Search Report under Sections 17(5), pertaining to GB Application No. 1701603.1, dated Jul. 19, 2017, 5 pages.

International Searching Authority—International Preliminary Report on Patentability, pertaining to International Application No. PCT/GB2018/050286, dated Jun. 22, 2018, together with the Written Opinion of the International Searching Authority, 15 pages.

International Searching Authority—International Search Report—International Application No. PCT/GB2018/050638 dated Jul. 13, 2018, together with the Written Opinion of the International Searching Authority, 12 pages.

Intellectual Property Office of the United Kingdom, Combined Search and Examination Report, Application No. GB2011454.2, dated Dec. 24, 2020, 6 pages.

International Searching Authority/EP, International Search Report and Written Opinion of the International Searching Authority, Application No. PCT/GB2018/050286, dated Jun. 22, 2018, 21 pages.

Intellectual Property Office of the United Kingdom, Search and Examination Report, Application No. GB1718276.7, dated Aug. 5, 2019, 4 pages.

Intellectual Property Office of the United Kingdom, Examination Report, Application No. GB1718276.7, dated Jan. 14, 2020, 2 pages.

Intellectual Property Office of Singapore, Search Report and Written Opinion, Application No. 11201907057V, dated Jan. 12, 2021, 8 pages.

Phase Change Material Product, Ltd. BoardICE Catalog, 2015, 2 pages.

Intellectual Property Office of the United Kingdom, Search Report, Application No. GB1713917.1, dated Dec. 1, 2017, 5 pages.

RELATING TO INSULATION

TECHNICAL FIELD

This invention relates to insulation materials and insulation laminates. In particular, though not exclusively, this invention relates to insulation materials comprising a phase change material, and to methods of making such insulation materials.

BACKGROUND

Thermal insulation reduces heat transfer by providing a barrier which mitigates against one or more of conduction, convection and radiation of heat. Such insulation is commonly used in buildings, and in a variety of other industries including the automotive industry, refrigeration and cold-chain transport.

It is known that phase change materials ("PCMs") can advantageously act as a temperature moderators in thermal insulation. In particular, PCMs can be used to store heat by causing a change in the "state" or "phase" of the materials, for example from a solid to a liquid. PCMs are therefore able to slow the process of heat gain and heat loss.

However, PCMs are difficult to utilise in insulation on account of their nature: their changes in phase present a challenge when it comes to containing PCMs and ensuring they remain positioned to function as insulation materials.

Solid/liquid PCMs are generally encapsulated as a free flowing liquid within a container. As such, they tend only to be used as part of a rigid system, such as a cool box. This is because, in their solid state, they break if flexed. Furthermore, such PCMs will pool in their liquid state, necessitating careful design of container volumes to maintain a suitably dispersed state of the PCM.

Clearly, such PCM systems have limited application and are ill-suited, for example, for use in flexible thermal insulation. Flexible thermal insulation is required for many applications for example to conform to custom shapes, or where storage volume is at a premium. Examples of such applications include building insulation, temporary insulation systems, such as cargo covers or the like, and insulation lining, for example in shipping boxes or containers.

PCMs are also available in a flexible form in "ice cube" bags. However, any increase in pressure on free-flowing liquids within such bags can transfer to the seams of the bag and lead to catastrophic failure.

There remains a need in the art for improved thermal insulation. It is an object of the invention to address at least one of the above problems or another problem associated with the prior art.

SUMMARY OF THE INVENTION

In one aspect of the invention there is provided a flexible insulation material comprising a flexible porous medium defining a pore volume, and a phase change material (PCM) within the pore volume.

It has been found that a PCM can hold its position within a pore volume of a porous medium. This can mitigate or prevent pooling of the PCM.

The insulation material is flexible in the sense that it has at least some ability to flex or bend. Different degrees of flexibility may be desirable for different applications.

Advantageously, in various embodiments, the flexible insulation material may be capable of bending under its own weight. A suitable method for determining whether a material can bend under its own weight is the Pierce cantilever test ASTM D1388.

In the Pierce cantilever test a specimen of the material to be tested is cut to 200 mm×25 mm. The sample is then gradually slid over the edge of a platform of a Pierce cantilever device. As the leading edge of the specimen projects from the platform, it may bend under its own weight, until the leading edge of the specimen makes contact with a sloping surface of the device angled downwards at an angle $8=41.5°$. The overhanging length (I) of the specimen is measured using a graduated ruler. The measured length (I) is multiplied by a scaling factor to give a value for the bending stiffness (G) in Nm.

For the purposes of the present specification, a material can bend under its own weight if a leading edge of the material makes contact with the sloping surface in the Pierce cantilever test.

The insulation material may be flexible only in a certain state of the PCM. For example, the insulation material may be flexible, or even bend under its own weight, only when the PCM is in a liquid state.

Advantageously, it has been found in various embodiments of the invention that incorporation of the PCM into the pore volume of the porous medium may allow for flexing where the PCM is in a solid state and would otherwise break.

Advantageously, the insulation material may be flexible in all states of the PCM. For example, the insulation material may be flexible when the PCM is in a liquid state and when the PCM is in a solid state. Typically, different degrees of flexibility will be achieved in different PCM states. For example, the insulation material may bend under its own weight in the sense of the Pierce cantilever test when the PCM is in a liquid state and have a lower degree of flexibility when the PCM is in the solid state.

To enhance flexibility the PCM may advantageously fill only part of the pore volume, with a remaining part of the pore volume comprising air. Suitably, at least 10% or at least 20% or at least 30% or at least 40% or even at least 50% of the pore volume may be filled with PCM. Optionally, up to about 95%, up to 90%, up to 85% or up to 80% of the pore volume may be filled with PCM.

In various embodiments, the phase change material may fill in the range of from 50 to 95% of the pore volume, in particular in the range of from 40 to 90% of the pore volume, such as in the range of from 50 to 85% of the pore volume. Optionally the remainder of the pore volume may be filled with air.

Suitably, to preserve air in the pore volume, the insulation material may be substantially uncompressed.

Conveniently, the insulation material may be air and/or vapour permeable. This may be of benefit, for example, where there is a desire to minimise condensation. It has been found that an air-open insulation material in which only part of the pore volume is filled by PCM can provide for both advantageous flexibility and permeability.

The insulation material may show air permeability in the sense that when the insulation material is subjected to a hydrostatic head of water and an air pressure in the region of 9 to 13 kPa is applied to the underside, bubbles can be seen in the water above the insulation material.

The porous medium may optionally comprise a layer. Suitably, the layer may have a thickness in the range of from 0.5 to 20 mm, such as in the range of from 1 to 5, e.g. in the range of from 1.5 to 3 mm.

Optionally, the porous medium may have a density (basis weight) greater than about 190 $g/m^2$, or of greater than about 200 g/m², or of greater than about 250 g/m², or of greater than about 270 g/m². The porous medium may have a density in the range of from 100 g/m² to 2500 g/m², such as in the range of from 100 g/m² to 2000 g/m², or in the range of from 150 g/m² to 1500 g/m², or in the range of from 150 g/m² to 1000 g/m², or in the range of from 150 g/m² to 750 g/m², or in the range of from 190 g/m² to 500 g/m², or in the range of from 190 g/m² to 350 g/m², or in the range of from 200 g/m² to 300 g/m², or in the range of from 250 g/m² to 300 g/m².

Advantageously, the porous medium may comprise fibres. To enhance absorption capacity, the fibres of the porous medium may have a relatively small diameter. Suitably the mean fibre diameter of the fibres may be the range of from 1 to 10 μm, or in the range of from 1 to 8 μm, or in the range of from 1 to 4 μm, or in the range of from 1 to 3 μm, for example such as about 1 μm, or about 2 μm, or about 3 μm.

The amount of phase change material able to be absorbed and held within a fibrous porous medium is dependent on the total fibre surface area, which in turn is dependent on the mean fibre diameter of the fibres and the density of the porous medium. The greater the total fibre surface area, the greater the amount of phase change material that can held within the fibrous porous medium.

The porous medium may in principle be made of any suitable material but may conveniently comprise a synthetic material. Conveniently, the porous medium may be polymeric, i.e. comprise or consist of one or more polymers (or copolymers).

In various embodiments, the porous medium comprises a polyolefin, optionally polypropylene.

Suitably, the porous medium may comprises a non-woven material. A variety of such materials are known. In various embodiments, melt-blown material has been found to provide particularly effective absorption of PCMs.

The PCM may be of any suitable type. A wide range of PCMs are known in the art. Such materials can advantageously act as a temperature moderator. In particular, such materials can be used to store heat by causing a change in the "state" or "phase" of the materials, for example from a solid to a liquid.

By way of illustration, in a solid/liquid PCM, the heat applied to the PCM in a solid state is absorbed by the PCM resulting in an increase in the temperature of the PCM. As the temperature of the PCM reaches its phase change temperature, that is the temperature at which the PCM changes from a solid state to a liquid, the PCM stops increasing in temperature and substantially maintains a constant temperature at its phase change temperature, "consuming" the heat being applied thereto and storing it as latent heat. In reverse, as the PCM drops in temperature, the sensible heat which was consumed by the change to a liquid phase and stored as latent heat is released at the phase change temperature of the PCM as the PCM changes into its solid state. As before, the PCM maintains a substantially constant temperature at its phase change temperature while giving up the stored latent heat of liquification as it turns into its solid state.

Latent heat is the heat gained by a substance without any accompanying rise in temperature during a change of state. In essence, it is the amount of heat necessary to change a substance from one physical phase to another (more dis-ordered), for example, the solid state to the liquid state. Once the phase change material has completely changed to the more dis-ordered phase, for example a liquid state, the temperature of the PCM begins to rise again as the applied heat is now absorbed as sensible heat.

In various embodiments of the invention, the PCM is organic. However, inorganic PCMs are also known and could suitably be used.

An organic PCM may, for example, comprise paraffin or a paraffin-derived hydrocarbon, a carbohydrate, a lipid, or a mixture thereof. Non-limiting examples of organic PCMs include n-tetradecane (C-14), n-hexadecane (C-16), and n-octadecane (C-18) and olefin.

Alternatively or additionally, the PCM may comprise an inorganic PCM such as an inorganic salt hydrate or eutectic material. Non-limiting examples of inorganic PCMs include calcium chloride hexahydrate, glauber salt, $Na_2SO_4.10H_2O$, $CaCl_2.6H_2O$, $NaHPO_4.12H_2O$, $Na_2S_2O_3.5H_2O$ and $NaCO_3.10H_{20}O$. *Heat and Cold Storage with PCM*, Mehling, H; Cabeza, L. F, ISBN: 978-3-540-68556-2 provides information on various PCMs and phase change temperatures.

In various embodiments, the PCM is hydrophobic. For example, the PCM may comprise compounds having carbon chains of at least eight, ten or twelve carbon atoms.

One example of an organic, hydrophobic PCM with a phase change temperature of about 21° C. is CrodaTherm™ 21, available from Croda Industrial Chemicals.

The PCM comprises material that will change phase in a temperature range between an anticipated minimum temperature and an anticipated maximum temperature to be controlled by the insulation material. Suitably, the phase change may be between solid and liquid.

Suitably, the PCM may change phase at a temperature in the range of from −20 to 70° C., optionally in the range of from −10 to 60° C., for example in the range of from 2 to 30° C. In an embodiment the PCM may change phase at a temperature in the range of from 10 to 30° C., optionally in the range of from 15 to 25° C. In another embodiment, the PCM may change phase at a temperature in the range of from 0 to 10° C., optionally in the range of from 2 to 8° C.

Suitably the insulation material may constitute a PCM layer. Discrete amounts of PCM may be distributed, preferably substantially evenly, within a PCM layer.

Suitably, the PCM layer may have a thickness in the range of from 0.5 to 10 mm, such as in the range of from 1 to 5 mm, e.g. in the range of from 1.5. to 3 mm. Suitably, the insulation material may be presented as a sheet or a roll.

From another aspect, the invention provides an insulation laminate comprising a layer including flexible insulation material according to any aspect or embodiment of the invention and one or more supplementary layers.

The supplementary layers, and indeed the insulation laminate as a whole, may advantageously be flexible, at least when the PCM is in a liquid state and optionally also when the PCM is in a solid state. Optionally, the insulation laminate may bend under its own weight in the sense of the Pierce test cited hereinabove.

Advantageously, the flexible insulation material may be sandwiched between first and second supplementary layers. Conveniently, the flexible insulation material may be surrounded by said one or more layers. This can assist in containing the PCM. Advantageously, the flexible insulation material may be encapsulated by the one or more supplementary layers. For example, the laminate may take the form of a pouch containing the flexible insulation material.

The one or more supplementary layers may comprise a barrier layer for resisting penetration of the PCM from the flexible insulation material layer out of the insulation laminate. A barrier layer may suitably comprise a monolithic or microporous film. Examples of monolithic films include cellulosic films, polyamide films and ethylene vinyl alcohol films, but a range of suitable films will be apparent to the skilled person.

To enhance insulation performance, the one or more supplementary layers may advantageously comprise a reflective layer having an emissivity of less than 0.5, preferably less than 0.3, more preferably less than 0.25 and most preferably less than 0.20. Suitably, such a reflective layer may comprise an outward-facing reflective surface that is exposed.

Optionally, a reflective layer may be vapour permeable, comprising a vapour permeable substrate bearing a coating having particles of infra-red reflective matter dispersed within a polymeric matrix and providing an exposed low-emissivity surface on an outward face of the reflective layer. Such vapour permeable reflective layers are described in WO 2009/024804.

The one or more supplementary layers may comprise a support layer. A support layer may, for example, comprise a fibrous woven or non-woven material. Suitably, a spunbond layer may be used as a support layer.

A support layer may suitably be laminated, e.g. by intermittent heat or adhesive bonding, to a barrier layer or reflective layer as described herein. Typically a support layer has a greater tensile and/or tear strength than the layer to which it is laminated.

In an embodiment, the one or more supplementary layers may comprise one or more air and/or vapour permeable layers. In particular, the one or more air and/or vapour permeable layers may have a moisture vapour transmission rate (MVTR) of at least 100 $g/m^2 \cdot 24$ hr, e.g. at least 200 $g/m^2 \cdot 24$ hr, or even at least 500 $g/m^2 \cdot 24$ hr as determined using a Lyssy Model L80-5000 Water Vapor Permeability Tester at 100%/15% RH, i.e. 85% RH difference and 23° C. In various embodiments, the MVTR may be at most 2000 $g/m^2 \cdot 24$ hr, e.g. at most 1500 $g/m^2 \cdot 24$ hr, or even at most 1000 $g/m^2 \cdot 24$ hr as determined using the aforementioned method.

Advantageously, the laminate may be air and/or vapour permeable. The laminate may, for example, have a moisture vapour transmission rate (MVTR) of at least 100 $g/m^2 \cdot 24$ hr, e.g. at least 200 $g/m^2 \cdot 24$ hr, or even at least 500 $g/m^2 \cdot 24$ hr as determined using a Lyssy Model L80-5000 Water Vapor Permeability Tester at 100%/15% RH, i.e. 85% RH difference and 23° C. In various embodiments, the MVTR may be at most 2000 $g/m^2 \cdot 24$ hr, e.g. at most 1500 $g/m^2 \cdot 24$ hr, or even at most 1000 $g/m^2 \cdot 24$ hr as determined using the aforementioned method.

To contain the insulation material, one or more layers of the laminate may be sealed at one or more side edges of the laminate. The layers may be sealed at all edges of the laminate. A sealed pouch of the insulation material may advantageously be provided.

In some embodiments, at least one of the one or more layers of the insulation laminate may comprise a thermosetting polymer. Advantageously, this can allow the one or more layers to be heat sealed together to form seams.

Suitably, the insulation laminate may be presented as a sheet or a roll.

Another aspect of the invention provides a cargo cover comprising an insulation material or insulation laminate according to any aspect or embodiment of the invention.

The cargo cover may comprise a plurality of flexible insulation laminates, each laminate being joined to, or arranged to be joined to, at least one other of the laminates, wherein one or more of the laminates is a laminate according to any aspect or embodiment of the invention. Suitably said one or more laminates according to the invention may comprise a pouch of the insulating material.

Conveniently, the cargo cover may have a deployed configuration defining a cavity for receiving a pallet of cargo.

Insulation laminates, in particular pouches, may be arranged to provide additional thermal protection by either totally enclosing a load to be transported (e.g. the walls and the top and bottom of a load) or may be located in discrete areas, such as the walls, to provide protection to the most at risk locations of the load. In the case of cargo covers, this is generally considered to be the top of the load. Insulation laminates may be arranged in any combination of the above locations to provide optimum thermal protection. The laminates or pouches may be joined together to form a continuous insulation layer in order to limit thermal bridging.

In various embodiments, insulation laminates according to aspects or embodiments of the invention may be removably incorporated in a cargo cover to create an integrated PCM cargo cover solution. Insulation laminates may, for example, be integrated by gluing to the inner layers of the cargo cover or by the creation of pockets in the inside of the cover. Such pockets may be formed from fabric, netting, webbing or film.

Advantageously, pockets may be formed from a low emissivity material to further increase the thermal protection provided by the cover. To further enhance thermal performance, low emissivity pockets may be combined with flexible thermal insulation, for example layers of PET wadding, bubble wrap, glass or mineral wool, 3-D spacer fabric or open or closed cell foam.

Optionally, the cargo cover may be as defined or described in PCT/GB2018/050286, which is incorporated herein by reference. For example, the cargo cover may be as described in claim 62 of PCT/GB2018/050286 as originally filed. The insulation laminate of such a cargo cover may be as described in relation to any aspect or embodiment of the invention herein.

In other applications, the insulation material or insulation laminate may advantageously be deployed so as to be in direct (heat conducting) contact with a product to be insulated. In this manner, a temperature equilibrium can be more readily maintained between the product and the PCM, which may enhance the PCM's performance.

Yet another aspect of the invention provides a container internally lined with an insulation material or insulation laminate according to any aspect or embodiment of the invention.

The container may comprise walls that are more rigid than the insulation material or insulation laminate, at least when the PCM is in a liquid state. Suitably, the container may comprise a cardboard box. Alternatively, the container may comprise a metal or wood crate or a shipping container.

The container may be lined on a plurality of sides. Optionally, all sides of the container may be lined so that items shipped therein are surrounded by lining of the insulation material or insulation laminate. For example, the container may have side walls, a bottom wall and a top wall, and each of the side, top and bottom walls may be lined with the insulation material or insulation laminate.

Advantageously, the insulation material or insulation laminate may be flexed to line a plurality of sides of the container. Thus the insulation material or insulation laminate may form a wrap that lines a plurality of sides of a container.

The insulation material or insulation laminate may be affixed to an inner wall of the container, for example with adhesive or other means known in the art.

Still a further aspect of the invention provides a method of making an insulation product, for example an insulation material, laminate, cargo cover or lined container according to any aspect or embodiment of the invention, the method comprising applying a phase change material (PCM) to pores of a flexible porous material to form a flexible insulation material. The PCM and/or flexible porous material may be as described anywhere herein.

Suitably, the method may comprise forming a laminate with the flexible insulation material and one or more supplementary layers, the supplementary layers. The supplementary layers may be as described anywhere herein.

Optionally, the method may comprise sealing one or more side edges of the laminate. In particular, the method may comprise forming a pouch from the one or more supplementary layers, the pouch enclosing the flexible insulation material.

The insulation material or insulation laminate is then incorporated into the insulation product. For example, a cargo cover may be made as defined or described in PCT/GB2018/050286. For example, the cargo cover may be as described in claim 52 of PCT/GB2018/050286 as originally filed.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Example 1—Solid State Flexibility

Figure 1:
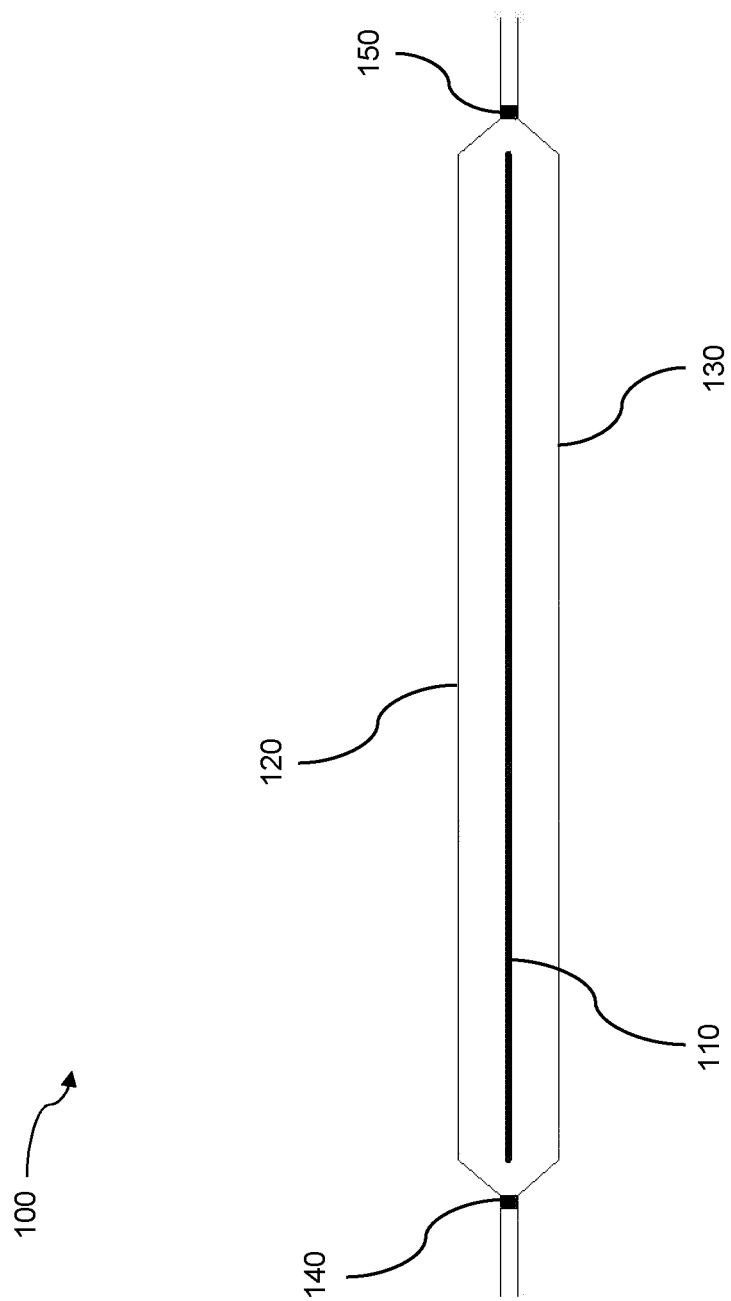
FIG. 1 is a cross-sectional view of an insulation pouch in accordance with an embodiment of the invention.

The flexibility of a PCM (CrodaTherm™ 21) in the solid state alone and absorbed on fibres was compared.

Two 100 g sheets comprising CrodaTherm™ 21 were prepared. Sheet one was made from a homogeneous sheet of 100% CrodaTherm™ 21. Sheet two was made from 100 g of CrodaTherm™ 21 absorbed in 280 g/m² of polypropylene (PP) meltblown fibre having a mean fibre width of typically 2 µm.

The flexibility of the sheets with the CrodaTherm™ 21 in solid form was tested. Sheet one broke and crumbled when it was flexed. Sheet two bent when it was flexed. This shows that PCMs when held within a fibrous layer can remain flexible in a solid state.

Example 2—PCM Holding Capacity of Polyester (PET) Wadding and PP Meltblown

The absorption capacity of two different fibrous polymer materials for a PCM (CrodaTherm™ 21) was investigated, as was the ability of the two materials to hold the PCM when suspended vertically. The properties of the two materials are compared in Table 1 below.

TABLE 1

Comparison of the properties of PET wadding and PP meltblown

|  | PET Wadding | PP Meltblown |
| --- | --- | --- |
| Nominal Weight (g/m²) | 190 | 280 |
| Fibre Diameter (µm) | 17 | 2 |
| Bulk Density (kg/m³) | 17.27 | 140 |
| Free Volume (%) | 98.75 | 84.62 |

An A4 (i.e. 210 mm×297 mm) sample an of approximately 11 mm thick 190 g/m² PET wadding and an A4 sample of an approximately 2 mm thick 280 g/m² PP meltblown were each exposed to approximately 100 g of CrodaTherm™ 21 PCM and hung vertically from a corner of the sample, with a container placed underneath. After hanging vertically for 5 minutes the samples were re-weighed.

It was found that the PET wadding had lost 65% by weight of the PCM. There was no change in the weight of the meltblown sample.

The amount of PCM able to be absorbed and held within a fibrous layer was therefore found to be dependent, for any given weight/unit area of fibrous material, on the absorbent capacity of the fibrous layer and the total surface area (the external dimensions) of the structure. The greater the total fibre surface area of the absorbent medium the greater the load of PCM it is able to hold.

Example 3—PCM Holding Capacity of PP Spunbond and PP Meltblown

The objective of this study was to assess how two different materials compromised of the same polymer-polypropylene (PP), but with different fibre diameters, absorb PCM (CrodaTherm™ 21) and hold the PCM when suspended vertically. The properties of the two polypropylene materials investigated, PP spunbond and PP meltblown, are compared in Table 2 below.

TABLE 2

Comparison of the properties of PP spunbond and PP meltblown

|  | PP Spunbond | PP Meltblown |
| --- | --- | --- |
| Nominal Weight (g/m²) | 50 | 40 |
| Fibre Diameter (µm) | 22 | 2 |
| Bulk Density (kg/m³) | 250 | 100 |
| Free Volume (%) | 72.5 | 89 |

A4 samples with thickness between 0.2-0.4 mm were taken of a nominal 40 g/m² PP meltblown and a nominal 50 g/m² PP spunbond. 25 g of CrodaTherm™ 21 PCM was poured on to the top surface of each sample. Each material was weighed after exposure to CrodaTherm™ 21 to see how much had been absorbed. Each sample was then hung vertically from a corner of the sample, with a container placed underneath. After 10 minutes elapsed the samples were re-weighed to assess the amount of CrodaTherm™ 21 remaining in the sample. The results of the study are shown in Table 3 below.

TABLE 3

Comparison of PCM holding capacity with different fibre diameters (weights measured to the nearest 0.5 g)

|  | 50 g PP Spunbond | 40 g PP Meltblown |
|---|---|---|
| Start weight (g) | 3.0 | 3.0 |
| Sample weight after PCM exposure (g) | 21.5 | 28.0 |
| Amount of PCM absorbed (g) | 18.5 | 25.0 |
| % PCM absorbed | 74.0 | 100.0 |
| Sample weight after hanging (g) | 12.5 | 27.0 |
| Weight change after hanging (g) | 9.0 | 1.0 |
| % weight change | 42.9 | 3.6 |

Adding 25 g of the PCM to the PP spunbond sample completely saturated the sample. By contrast, the finer fibre PP meltblown sample was not 100% saturated when adding 25 g of the PCM, with dry areas of material visible to the naked eye. Despite the higher basis weight of the PP spunbond sample, the finer fibre PP meltblown demonstrated a higher holding capacity of PCM.

Example 4—Insulation Laminate

Two 11 mm thick low emissivity insulation assemblies were compared. Both assemblies contained the same primary insulation material. One assembly contained a secondary insulation layer consisting of approx. 2 mm meltblown PP with approx. 1.6 kg/m² CrodaTherm™ 21 PCM absorbed into the material. The other assembly contained no secondary insulation layer.

Identical pallets formed from empty cardboard boxes were covered by each of the assemblies, and each assembly was exposed to the same external ambient climate conditions (direct sunlight; average air temp. 21.8° C.; min. air temp. 16.9° C.; max. air temp. 28.9° C.). The change in temperature between the insulation assembly and a small empty box on top of the pallet was monitored over time. The starting temperatures in the boxes above the loads were 17.2° C. for the pallet covered by the assembly with PCM and 16.9° C. for the pallet covered by the assembly without PCM.

The pallet covered by the assembly without PCM warmed to 25° C. within 56 minutes and hit a maximum temperature of 35.2° C. over the 5 hour exposure. The pallet covered by the assembly comprising PCM took 4 hours 56 minutes to reach 25° C., i.e. 4.3 times longer than the assembly without PCM, and hit a maximum temperature of only 25.3° C.

A further external comparison of primary insulation materials with different emissivities combined with a secondary PCM insulating layer was conducted. Two assemblies were prepared. One assembly had an 11 mm thick primary insulation material with an outer layer emissivity of 0.02-0.05 and a secondary layer of CrodaTherm™ 21 PCM. The other assembly had an 11 mm thick primary insulation material with an outer layer emissivity of 0.16-0.18 and a secondary layer of CrodaTherm™ 21 PCM.

Identical pallets were made up with boxes filled to 20% capacity with 500 mL bottles of water. A small box was placed on the top of each pallet containing a temperature probe. An A4 secondary layer of PCM (100 g CrodaTherm™ 21) was placed over the temperature probe box. The pallets were then covered by the above different emissivity covers and put outside and exposed to the same external ambient climate (direct sunlight; average air temp. 27.4° C.; min. air temp. 23.3° C.; max. air temp. 31.1° C.). The starting temperatures in the boxes above the loads were 19.2° C. for the pallet covered by the assembly having a primary insulation material with an outer layer emissivity of 0.02-0.05, and 19.1° C. for the pallet covered by the assembly having a primary insulation material with an outer layer emissivity of 0.16-0.18.

It was found that the assembly having a primary insulation material with an outer layer emissivity of 0.02-0.05 extended the time taken for the measured temperature of the assembly to warm to 25° C. by 1 hour 17 minutes as compared to the assembly having a primary insulation material with an outer layer emissivity of 0.16-0.18.

Thus, it has been found that the introduction of even a relatively thin secondary layer of PCM to a primary insulation structure demonstrates a significant improvement to thermal protection. Moreover, introducing a lower emissivity (<0.05) outer layer to the primary insulation structure improves thermal protection even further.

Example 5—Insulation Pouch

FIG. 1 shows an insulation pouch 100 according to an embodiment of the invention. In order to avoid PCM leaching out from the PCM adsorbed flexible fibrous layer 110 in its liquid state, the flexible fibrous layer is encapsulated by suitable barrier layers 120, 130 sealed together at both ends 140, 150 to form insulation pouch 100 as shown.

The barrier layers 120, 130 encapsulating the PCM adsorbed flexible fibrous layer 110 may be made of any film resistant to penetration to the chosen PCM. Cellulosic film, polyamide film and EVOH have been found to be resistant to the PCM CrodaTherm™ 21, an oily plant derivative. The barrier layers 120, 130 may be monolithic, co-extruded or laminated films. Such films can be coated with any suitable heat sealable layer such as LDPE, PVDC, PET, PTFE or PUR. Alternatively in order to improve the breathability of pouch 100, an adhesive net may be applied to the barrier layers 120, 130 to provide a method of sealing the perimeter of the insulation pouch 100.

Insulation pouch 100 may be made to any shape or size to enclose its intended load. Consecutive insulation pouches 100 may be joined together to cover large areas or odd shapes. The insulation pouches 100 can be joined by overlapping, butt joining or any suitable known method.

Example 6—Automated Manufacturing of Pouches

Figure 2:
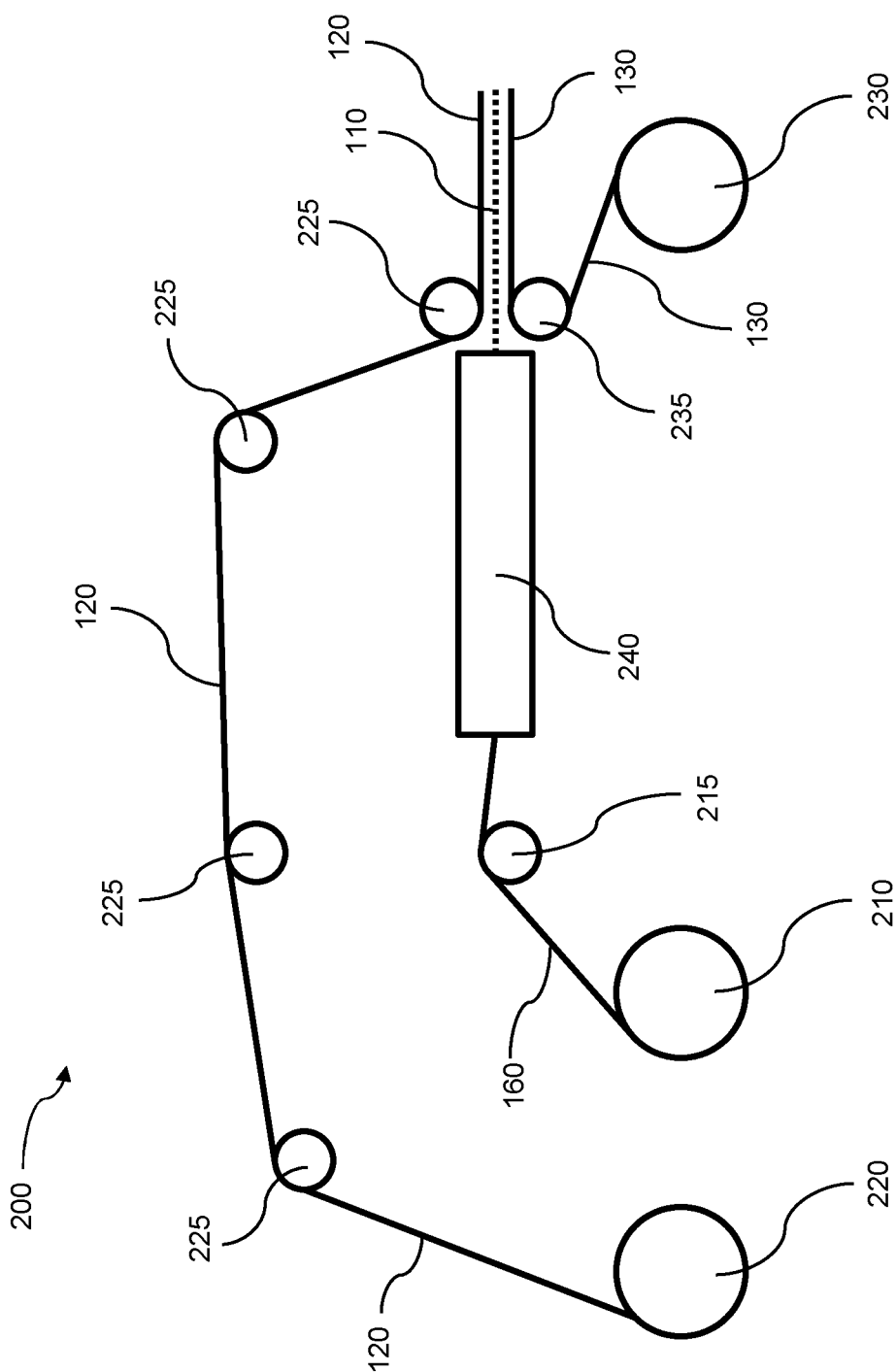
FIG. 2 is an illustration of an automated apparatus for manufacturing insulation pouches.

FIG. 2 shows an automated apparatus 200 for manufacturing insulation pouches 100. The apparatus 200 comprises a series of three unwind stations 210, 220 and 230. Unwind stations 220 and 230 pay off top and bottom barrier layers 120 and 130 respectively. A series of smaller rollers 225 and 235 assist with delivery of the barrier layers 120, 130.

Unwind station 210 pays off a flexible fibrous layer 160. Assisted by small roller 215, unwind station 210 feeds into a coating system 240 where a defined amount of liquid PCM is applied to the fibrous layer 160 to form PCM adsorbed flexible fibrous layer 110. Coating system 240 may, for example, apply the PCM to the flexible absorbent 160 layer by dipping, spraying or transfer coating.

As the PCM adsorbed flexible fibrous layer 110 exits the coating system 240, it is cut into the required length for a pouch. The length of PCM adsorbed flexible fibrous layer 110 is then deposited onto barrier layer 130, which is delivered to the exit of coating system 240 from unwind station 230 by small roller 235. Barrier layer 120 is simultaneously deposited on top of the length of PCM adsorbed flexible fibrous layer 110, having been delivered to the exit of the coating system 240 from unwind station 220 by small rollers 225.

The three layers are brought together and presented to a sealing unit (not shown). The sealing unit bonds barrier layers 120, 130 together around the perimeter of the PCM adsorbed flexible fibrous layer 110, thus encapsulating the PCM adsorbed flexible fibrous layer 110 and forming insulation pouch 100. Sealing may be by any known method such as heat sealing or ultrasonic welding.

The insulation pouch 100 may be cut at both ends 140, 150 by a cutting machine (not shown) to form an individual insulation pouch 100, or may not be cut to provide a string of joined insulation pouches 100.

Lay flat tubing or centre fold material may alternatively be used to form the barrier layers 120, 130 from a single piece of material, in order to reduce the number of required seals and improve processing efficiency.

Example 7—Cargo Covers

A comparison of the suitability of the insulation laminate of Example 4 and Peli Biothermal Coolgel GP2840 (Comparative Example A) for use in cargo covers is shown in Table 4.

TABLE 4

Comparison of suitability of insulation materials for use in cargo covers

| | Example 4 | Comparative Example A |
|---|---|---|
| Insulation material | CrodaTherm ™ 21/ melt-blown polyproplene | Peli Biothermal Coolgel GP2840 |
| Freezing temperature | 19° C. | 0° C. |
| Refrigeration required? | No | Yes |
| Freeze/Melt cycle during shipment | Yes | No - Freezing temperature below ambient conditions |

Recently, the performance of cargo covers has been enhanced with the use of traditional phase change mediums such as Peli Biothermal Coolgel GP2840. However, once this product has changed from a solid to a liquid state, the process cannot be reversed without refrigeration. For this reason a large quantity of Peli Biothermal Coolgel GP2840 must be frozen to −18° C. prior to transportation. For this reason Peli Biothermal Coolgel GP2840 is not suitable for integration into a cargo cover.

By absorbing CrodaTherm™ 21 into melt-blow polypropylene fibre wadding, it is possible to integrate the insulation material into the cover and also maintain the cover at a temperature between 15 to 25° C. using just three-quarters of the weight of CrodaTherm™ 21 compared to Peli Biothermal Coolgel GP2840, and without the need for any refrigeration (depending on the ambient temperature).

CrodaTherm™ 21 has freezing and melting temperatures of 19° C. and 21° C. respectively. As a load may experience temperature variations above and below this temperature during transportation, the ability of the insulation material of Example 4 to undergo repeated phase transitions means that it will continue to function through each ambient temperature change across this range. Unlike Peli Biothermal Coolgel GP280, the insulation material of Example 4 does not need to be separated from the pallet and the cargo cover to be re-frozen. Hence it is ideally suited for integration into cargo covers.

The invention claimed is:

1. A flexible insulation material comprising a flexible porous medium comprising fibres and defining a pore volume, and a phase change material (PCM) within the pore volume, wherein the phase change material fills in the range of from 40 to 95% of the pore volume, and a remaining part of the pore volume comprises air.

2. The insulation material of claim 1, wherein the flexible insulation material bends under its own weight (to be measurable under ASTM D1388) when the PCM is in a liquid state.

3. The insulation material of claim 1, wherein the insulation material is flexible when the PCM is in a solid state.

4. The insulation material of claim 1, wherein the material is vapour permeable.

5. The insulation material of claim 1, wherein the fibres have a mean fibre diameter in the range of from 1 to 10 μm.

6. The insulation material of claim 1, wherein the porous medium comprises a polyolefin.

7. The insulation material of claim 1, wherein the porous medium comprises a polymeric non-woven material.

8. The insulation material of claim 1, wherein the porous medium comprises a melt-blown.

9. The insulation material of claim 1, wherein the PCM is organic.

10. The insulation material of claim 1, wherein the PCM is hydrophobic.

11. The insulation material of claim 1, wherein the phase change material changes phase at a temperature in the range of from 5 to 30° C.

12. An insulation laminate comprising a layer including a flexible insulation material comprising a melt-blown flexible porous medium comprising fibres having a mean fibre diameter in the range of from 1 to 10 μm and defining a pore volume, and an organic, hydrophobic phase change material (PCM) within the pore volume wherein the phase change material fills in the range of from 40 to 95% of the pore volume, and a remaining part of the pore volume comprises air, said layer being sandwiched between first and second supplementary layers.

13. The insulation laminate of claim 12, wherein the supplementary layers comprise a barrier layer for resisting penetration of the PCM from the flexible insulation material layer out of the insulation laminate.

14. The insulation laminate of claim 13, wherein the barrier layer comprises a monolithic film.

15. The insulation laminate of claim 14, wherein the monolithic film comprises cellulose, ethylene vinyl alcohol, or a combination thereof.

16. The insulation laminate of claim 12, wherein the supplementary layers comprise a reflective layer having an emissivity of less than 0.5.

17. The insulation laminate of claim 12, wherein the supplementary layers comprise a support layer, the support layer comprising a fibrous woven or non-woven material.

18. The insulation laminate of claim 12, comprising a sealed pouch of the insulation material.

19. A cargo cover comprising an insulation laminate comprising a layer including a flexible insulation material comprising a melt-blown flexible porous medium comprising fibres having a mean fibre diameter in the range of from 1 to 10 μm and defining a pore volume, and an organic, hydrophobic phase change material (PCM) within the pore volume wherein the phase change material fills in the range of from 40 to 95% of the pore volume, and a remaining part of the pore volume comprises air, said layer being sandwiched between first and second supplementary layers.

20. The cargo cover of claim 19, comprising one or more pockets for removably receiving said insulation laminate.

21. The cargo cover of claim 19, having a deployed configuration defining a cavity for receiving a pallet of cargo.

* * * * *